US011990757B2

(12) United States Patent
Gao

(10) Patent No.: US 11,990,757 B2
(45) Date of Patent: May 21, 2024

(54) CURRENT DETECTION BASED RENEWABLE ENERGY SYSTEM FOR A DATA CENTER

(71) Applicant: Baidu USA LLC, Sunnyvale, CA (US)

(72) Inventor: Tianyi Gao, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 159 days.

(21) Appl. No.: 17/157,633

(22) Filed: Jan. 25, 2021

(65) Prior Publication Data

US 2022/0239105 A1 Jul. 28, 2022

(51) Int. Cl.
H02J 3/32 (2006.01)
H02J 7/35 (2006.01)

(52) U.S. Cl.
CPC .......... H02J 3/32 (2013.01); H02J 7/35 (2013.01); H02J 2300/24 (2020.01)

(58) Field of Classification Search
CPC ............. H02J 3/32; H02J 7/35; H02J 2300/24
See application file for complete search history.

(56) References Cited

U.S. PATENT DOCUMENTS

| 7,962,769 B1* | 6/2011 | Patel | G06F 1/26 713/300 |
| 2011/0187197 A1 | 8/2011 | Moth | |
| 2011/0273022 A1* | 11/2011 | Dennis | H02J 3/46 307/72 |
| 2012/0091943 A1* | 4/2012 | Manor | H02J 7/35 320/101 |
| 2014/0060100 A1* | 3/2014 | Bryson | H02J 3/381 62/235.1 |
| 2014/0062206 A1 | 3/2014 | Bryson | |
| 2018/0234018 A1* | 8/2018 | Tsubota | H02J 3/381 |
| 2022/0060016 A1* | 2/2022 | Mitsunaga | H02J 7/34 |
| 2022/0185437 A1* | 6/2022 | Myslinski | A61B 5/0004 |

FOREIGN PATENT DOCUMENTS

EP 3965244 A2 3/2022

* cited by examiner

Primary Examiner — Charles Cai
(74) Attorney, Agent, or Firm — WOMBLE BOND DICKINSON (US) LLP

(57) ABSTRACT

The power supply system comprises an inter-system bus, one or more renewable energy systems and one or more second switches, where each second switch is coupled to one renewable energy system and to connect to the corresponding renewable energy system to the inter-system bus. The power supply system further comprises one or more current detection circuits, where each current detection circuit is coupled to one renewable energy system to detect an output current of the corresponding renewable energy system. The power supply system further comprises a central controller coupled to the inter-system bus and configured to, in response to the output current of the corresponding renewable energy system is higher than a predetermined threshold current, activate a corresponding second switch to connect the corresponding renewable energy system to the inter-system bus to provide a renewable power to at least one of the one or more server clusters, or storage systems.

20 Claims, 11 Drawing Sheets

CURRENT DETECTION BASED RENEWABLE ENERGY SYSTEM FOR A DATA CENTER

FIELD OF THE DISCLOSURE

Embodiments of the present disclosure relate generally to architecture for power supply to data centers and, more particularly, renewable energy systems for data centers designed with current detection.

BACKGROUND

Large clusters of computer servers can be kept in dedicated facilities (e.g., data centers), often in a rack enclosure. These dedicated facilities require a considerable amount of power, which is drawn from a utility (e.g., alternating current (AC) mains). Along with needing power to operate the clusters of computer servers, the facilities also draw power to maintain a well regulated environment (e.g., through the use of a computer room air conditioning (CRAC) unit). Drawing such a large amount of power from the AC mains increases the overall cost of operating a facility and increases the facility's carbon footprint.

To decrease dependency on the AC mains and reduce a carbon footprint, some facilities are turning to renewable energy/power systems, such as a photovoltaic (PV) system. It is important to effectively implement a renewable power system, such as a PV system, into a data center, in order to improve cost efficiency and operation efficiency, and to decrease carbon emission as well as to maintain power availabilities. Currently, a battery system or a storage system is needed to attached to a PV system (or a PV panel) to store and collect an output solar power. The storage system or battery system significantly increase the complexity of a power supply system for a data center. The cost is increased as well. The storage system or battery system also decreases the efficiency since the renewable energy has to be stored before being used. In addition, PV system is needed especially for large scale data centers which consumes a huge amount of power, due to the consideration of environmental regulations.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
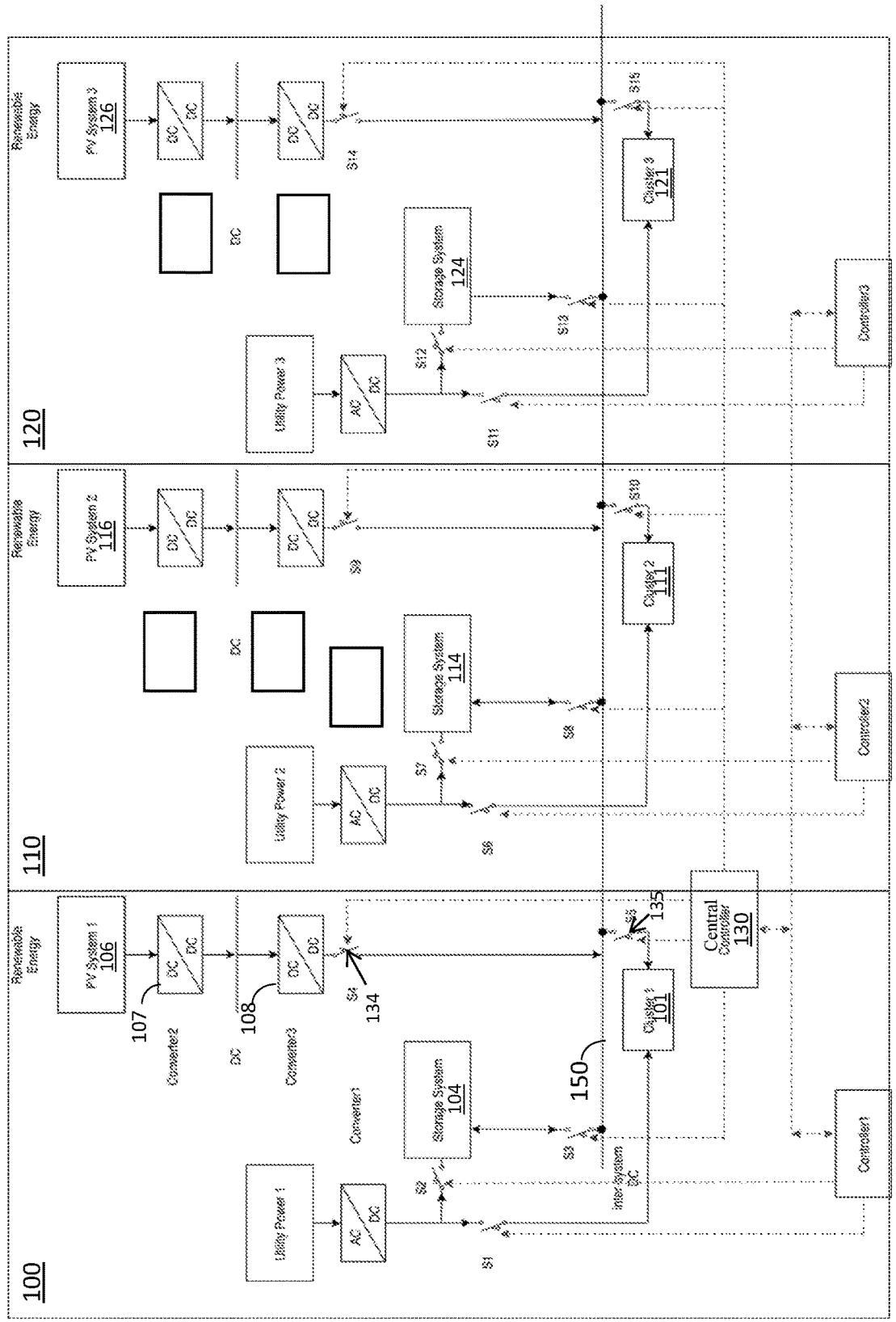
FIG. 1 is a block diagram illustrating an example of system architecture including one or more renewable energy systems of a data center according to one embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

The present disclose solves the problem of reducing cost (e.g., component cost, operating cost, service/maintenance cost, etc.) and complexity of implementing a renewable energy system, e.g., a photovoltaic (PV) system, in a data center, for example, by eliminating (or removing) the need for batteries. Embodiments disclosed herein eliminate the energy storage system (or batteries) and at the same time, solve the challenge of determining the availabilities of the renewable power. A detection/sensing method for efficiently using the renewable energy system without the energy storage system, is also disclosed. The availability of the renewable energy system, e.g., the PV system, is detected in real-time. Moreover, due to the fact that there may be different availability levels of the PV system power, control methods including both hardware and software for efficiently managing and regulating the power in different conditions are disclosed. In this way, the renewable energy may be used in high efficiency. The renewable energy system, e.g., the PV system may be integrated into the existing data center power infrastructure, both greenfield ones and brownfield ones, including hyperscale with multiple data center buildings and container data center ones. A multi-level control logic is disclosed to use the renewable power when the power is considered to be adequate.

A current detection based renewable energy system, e.g., PV system, for a data center is described herein. For example, a current detection circuit is used for integrating the PV system to the power supply system as well as controlling the PV system to provide the power to the data center. The current detection circuit has resistors and current sensor for detecting the output solar power in real time and then the measured current is used to control the switch operation status for different operation scenarios. Several switches are used to control the power flow. In addition, the current detection circuit enables eliminating an energy storage system for the PV system and integrating the PV system into a data center power facility efficiently. The solution is extended to multiple PV systems for multiple IT clusters using a two level control method. The PV system and the corresponding power output may be either connected with a backup power system or directly used as a power input for the IT cluster, or other equipment such as ones in cooling systems. The different operating modes are configured for the detection circuit, which may be advantageous in different scenarios.

According to some embodiments, a power supply system for a data center having one or more of server clusters is disclosed herein. The power supply system comprises an inter-system bus having one or more first switches, where each first switch is to connect the inter-system bus to one of the one or more server clusters. The power supply system comprises one or more renewable energy systems and one or more second switches, where each second switch is coupled to one renewable energy system and to connect to the corresponding renewable energy system to the inter-system bus. The power supply system further comprises one or more current detection circuits, where each current detection circuit is coupled to one renewable energy system to detect an output current of the corresponding renewable energy system. The power supply system further comprises a central controller coupled to the inter-system bus and configured to, in response to the output current of the corresponding renewable energy system is higher than a predetermined threshold current, activate a corresponding second switch to connect the corresponding renewable energy system to the inter-system bus to provide a renewable power to at least one of the one or more server clusters.

According to some embodiments, a data center comprises one or more server clusters and an inter-system bus having one or more first switches, where each first switch is to connect the inter-system bus to one of the one or more server clusters. The data center comprises one or more renewable energy systems and one or more second switches, where each second switch is coupled to one renewable energy system and to connect to the corresponding renewable energy system to the inter-system bus. The data center further comprises one or more current detection circuits, where each current detection circuit is coupled to one renewable energy system to detect an output current of the corresponding renewable energy system. The data center further comprises a central controller coupled to the inter-system bus and configured to, in response to the output current of the corresponding renewable energy system is higher than a predetermined threshold current, activate a corresponding second switch to connect the corresponding renewable energy system to the inter-system bus to provide a renewable power to at least one of the one or more server clusters.

According to some embodiments, a method of managing a power supply system of a data center having one or more of server clusters is disclosed herein. An output current of a corresponding renewable energy system is detected, where the power supply system comprises an inter-system bus having one or more first switches, one or more renewable energy systems, one or more second switches and one or more current detection circuits, wherein each first switch is to connect the inter-system bus to one of the one or more server clusters, wherein each second switch is coupled to one renewable energy system and connect to the corresponding renewable energy system to the inter-system bus, wherein each current detection circuit is coupled to one renewable energy system to detect the output current of the corresponding renewable energy system. Whether the output current of the corresponding renewable energy system is higher than a predetermined/recharacterized threshold current is determined. A corresponding second switch is activated to connect the corresponding renewable energy system to the inter-system bus to provide a renewable power to at least one of the one or more server clusters, in response to the output current of the corresponding renewable energy system is higher than the predetermined threshold current.

In one embodiment, the one or more renewable energy systems include one or more photovoltaic (PV) systems.

In one embodiment, the central controller is further configured to activate one of the one or more first switches to connect a corresponding server cluster to the inter-system bus.

In one embodiment, the power supply system further comprises one or more third switches and one or more first converters, where each third switch is coupled between one renewable energy system and one first converter.

In one embodiment, the power supply system further comprises one or more fourth switches, where each fourth switch is coupled to one renewable energy system to form a close loop in a corresponding current detection circuit.

In one embodiment, the power supply system further comprises one or more PV controllers, where each PV controller corresponds to one renewable energy system to receive the output current from the corresponding current detection circuit of the corresponding renewable energy system and to control the corresponding renewable energy system.

In one embodiment, one current detection circuit of the one or more current detection circuits operates in a close circuit mode to detect an output current of a corresponding renewable energy system, wherein other current detection circuits operate in an open circuit mode.

In one embodiment, one current detection circuit of the one or more current detection circuits operates in a close circuit mode, wherein other current detection circuits switch from an open circuit mode to a close circuit mode periodically.

FIG. 1 is a block diagram illustrating an example of system architecture including one or more renewable energy systems of a power supply system of a data center 100 according to one embodiment. The data center 100 comprises one or more server clusters (e.g., 101, 111, 121) and an inter-system bus 150. The inter-system bus 150 may have one or more first switches, for example, switches S5, S10, S15, where each switchable connection is to connect the inter-system bus 150 to one of the one or more server clusters (e.g., 101, 111, 121). The data center comprises one or more renewable energy systems (e.g., 106, 116, 126) and one or more second switches (e.g., S4, S9, S14), where each second switch (e.g., S4, S9, or S14) is coupled to one renewable energy system (e.g., 106, 116, or 126), and where each second switch (e.g., S4, S9, or S14) is to connect to the corresponding renewable energy system (e.g., 106, 116, or 126) to the inter-system bus 150. The one or more renewable energy systems (e.g., 106, 116, 126) may be one or more PV systems, as illustrated in FIG. 1. In an embodiment, the one or more PV systems may be connected to a DC bus between a first DC-DC converter (e.g., 107) and a second DC-DC converter (e.g., 108).

The data center may include one or more subsystems/modules, e.g., module 100, 110 and 120. Each subsystem/module may include a corresponding power supply subsystem, a corresponding server cluster and a corresponding control. Each of the one or more renewable energy systems (e.g., 106, 116, 126) may be included in one of the one or more subsystems/modules (e.g., 100, 110, 120). The entire power supply system may include as many modules as needed to serve all of the servers. Moreover, the system can be easily expanded when needed by the simple addition of modules. Each of the modules may include three energy sources: utility power, storage power, and renewable energy/ power (PV system). For example, by closing switches S1, S6 and S11, each of the clusters (e.g., 101, 111, 121) may be fed directly from the utility power, which is the normal mode of operation. Similarly, by closing switches S3, S8 and S13, each of the clusters (e.g., 101, 111, 121) may be fed from the battery storage. Finally, by closing switches S4, S9, and S14, each of the clusters (e.g., 101, 111, 121) may be fed from the renewable energy/power source. Each of these switches may be controlled independently by its respective local controller, indicated as controller 1, controller 2, and controller 3, such that each cluster may be fed from a different source as needed. Each of the local controllers communicate with the central controller 130.

The one or more power supply subsystems/modules are also interconnected via inter-system DC bus 150. That is, within each module, the server cluster may be connected to the inter-system DC bus 150 via switches S5, S10 and S15. The inter-system DC bus 150 may be fed by any or all of the storage systems 104, 114 and/or 124 and by any or all of the renewable energy systems 106, 116 and/or 126. The various switches of the inter-system DC bus 150 are controlled by the central controller 130, such that any of the clusters may be energized by any of the available sources of any cluster. That is, using the inter-system DC bus 150, a server cluster of one module may be energized by a power source of another module. In this manner, the backup resources are shared among the modules to reduce the amount of required backup power sources needed to be physically configured per server cluster, while increasing the available backup resources during certain operations.

In one embodiment, each of the renewable systems, e.g., the PV systems, is connected to the first DC-DC converter (e.g., 107) and the second DC-DC converter (e.g., 108). The first DC-DC converter (e.g., 107) is used to control the voltage supplied by each individual PV system and to control the interconnection of all of the individual PV panels. The second DC-DC converter (e.g., 108) is used to control the voltage applied from each of the individual PV systems to the inter-system DC bus 150. Multiple level convertors may improve the configuration flexibilities for further system upgrading and adjusting.

For example, when switches S1, S6 and S11 are open, power can be supplied to server cluster 101 by closing switch S5 to the inter-system DC bus 150. Then energy can be supplied to the inter-system DC bus 150 from any of the storage or PV systems of any module. For example, backup power may be supplied by closing any or all of switches S3, S8 and/or S13, such that the power to the inter-system DC bus 150 is provided by any or all of the storage systems 104, 114 and/or 124. Power to the inter-system DC bus may also be supplied from any or all of the PV systems by closing switches S4, S9 and/or S14. It needs to be motioned that different lines connected to the storage systems can be understood as representing the power flow.

As illustrated in FIG. 1, the inter-system bus 150 is used to connected renewable power resources and storage systems from the one or more power supply modules. Each of the IT clusters (101, 111, 121) has two power sources which are dedicated utility power and intersystem DC bus. The system DC is used to connect utility power and storage system. The central controller 130 is used to control the switches of the storage system and PV system in all the power supply modules. The central controller 130 may also interact with the subsystem controllers (local controllers), such as control 1, control 2, control 3. Whenever a subsystem/module has utility power outrage or needs maintenance, the renewable power resources and power storage systems of both itself and other subsystems which have enough power can be used to serve the cluster of the subsystem/ module.

There are three converters in the power supply system, converter 1 is used to convert the utility AC source to DC source; converter 2 (e.g., 107) is used to normalize the output of the PV system to a certain level for other use (like charging batteries or connected to other workloads); converter 3 (e.g., 108) is used to regulate the voltage to the designed requirement of inter-system DC bus 150. The detailed configurations of the PV system including the power rating may be different. For identical PV systems, the output maybe slightly different or may be considered as identical if located in the same data center.

Figure 2:
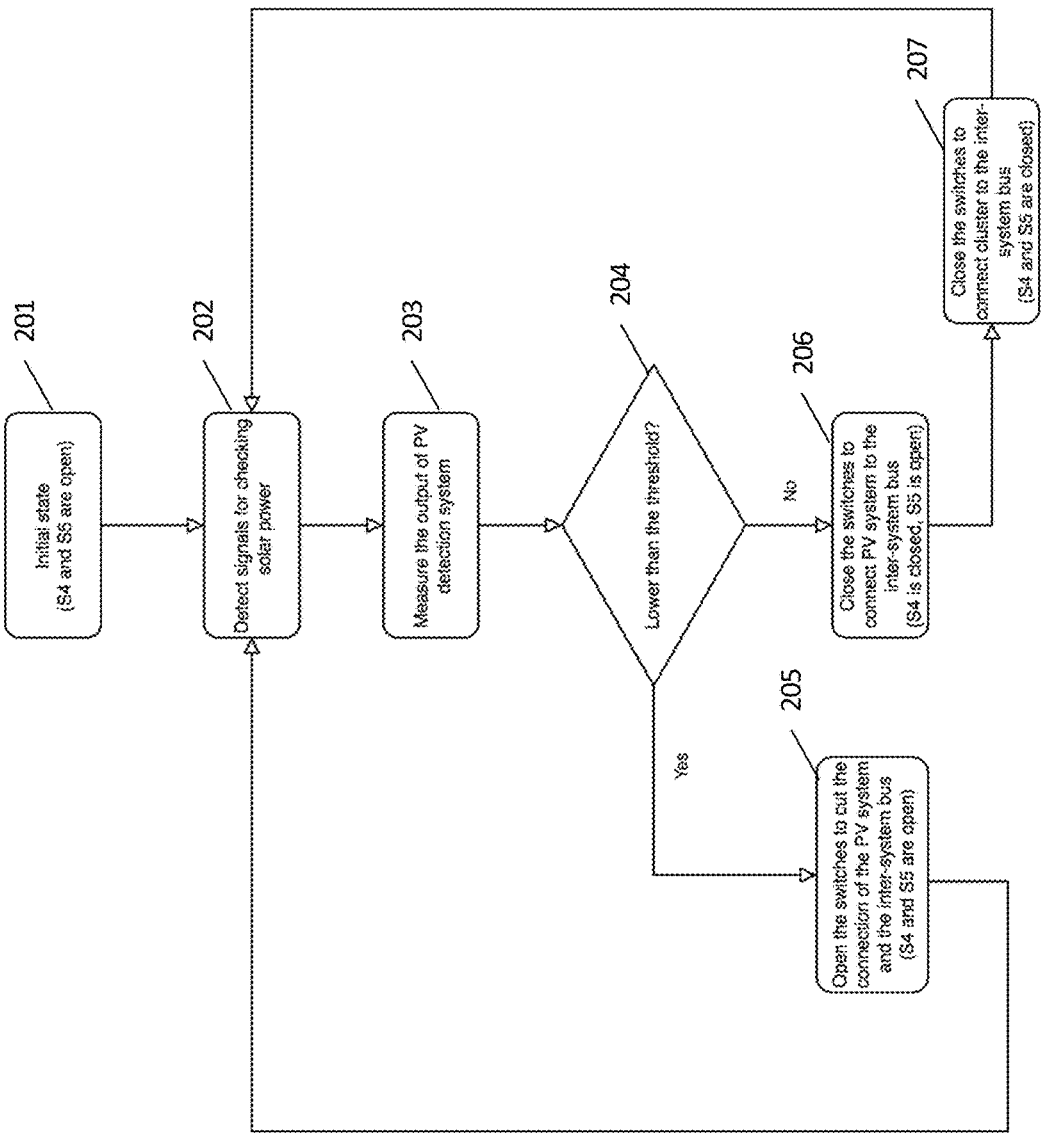
FIG. 2 is a flow diagram illustrating an example of controlling a power supply system of a data center according to one embodiment.

FIG. 2 is a flow diagram 200 illustrating an example of controlling a power supply system of a data center according to one embodiment. Referring to FIG. 1 and FIG. 2, at an initial state 201, both the switches S4 134 and S5 135 are open. The switch S4134 is to connect the PV system 106 to the inter-system Bus 150. The switch S5 135 is to connect the server cluster 101 to the inter-system Bus 150. In this scenario, at block 202, a signal for checking a solar power is detected. The availability of the current detection circuit of the PV system 106 is captured. At block 203, an output current of the current detection circuit of the PV system 106 is measured. If the detection current signal is enabled, then a real time current output of the PV system 106 is obtained. The module 100 is used as an example, the similar control method may be applied to other modules such as module 110, 120, etc.

At block 204, whether the output current in the dedicated detection current circuit is lower than a predetermined threshold current or satisfies with a predetermined requirement is determined. The predetermined threshold current may be characterized and tuned based on the PV source and the load. For example, the predetermined threshold current may be based on the actual PV system performance and specifications as well as the current detection circuit. The predetermined threshold current of the detection circuit is correlated to how much power the PV system may be able to delivery to the corresponding load once the PV system is connected to the load. This characterization procedure may be done or completed before the system being operated, and the threshold current may be adjusted during operating. At block 205, the central controller 130 may control the switches (e.g., S4 134) to cut the connections between the PV system and the inter-system bus, if the output current is lower than the threshold current or does not reach the predetermined requirement. At block 206, if the output current is not lower than the threshold current or reaches the predetermined requirement, the central controller may close the switches (e.g., S4 134) to send the PV power to the inter-system bus 150. At block 207, the central controller may close the switch (e.g., S5 135) between the cluster and the inter-system bus.

In this way, accurate measurements of the solar power quality are provided. The management of the power supply system of the data center including the IT cluster are based on the accurate measurements of the solar power quality. The current detection circuit is able to detect and provide accurate measurement on the power quality, with minimum overhead to the power supply system.

Figure 3:
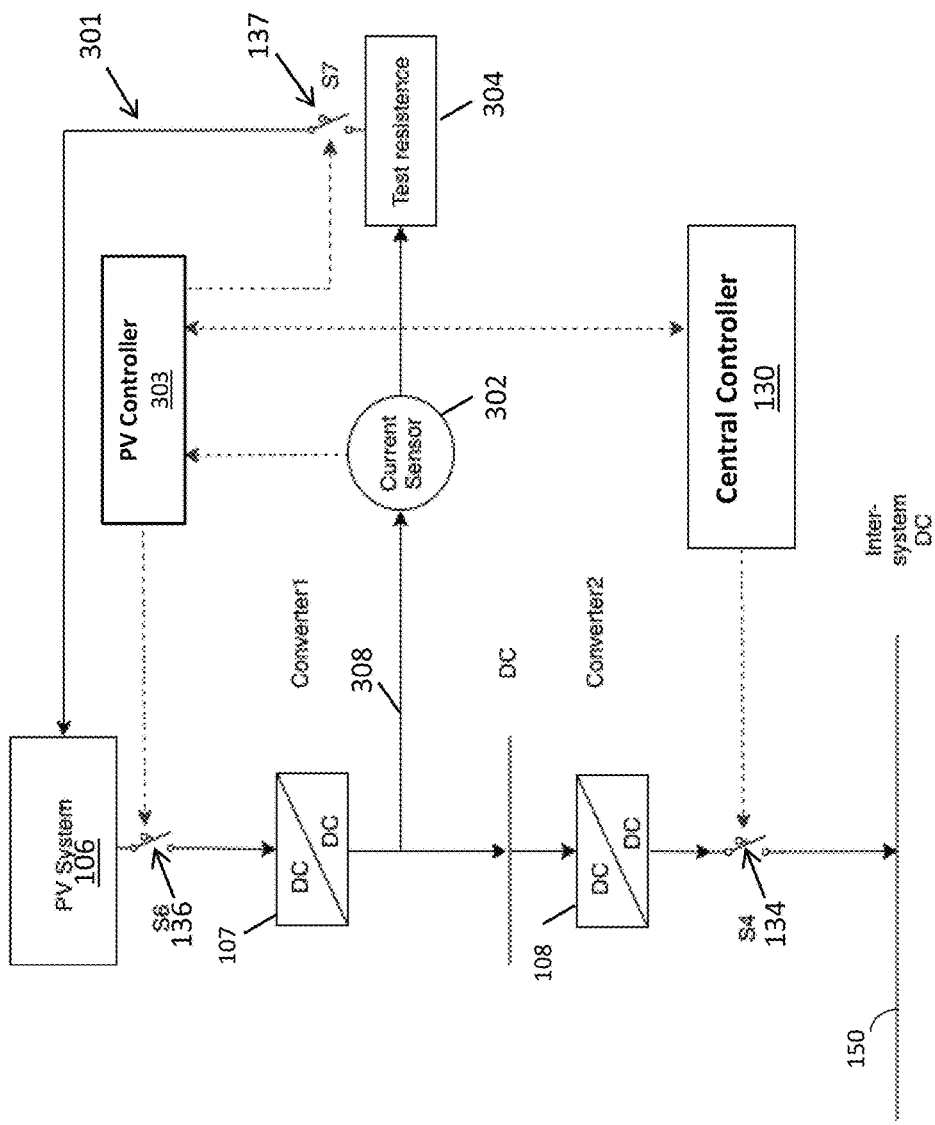
FIG. 3 is a block diagram illustrating an example of a current detection circuit for a renewable energy system according to one embodiment.

FIG. 3 is a block diagram 300 illustrating an example of a current detection circuit 301 for a renewable energy system 106 according to one embodiment. The renewable energy system (e.g., PV system) 106 may have a switch S4 134 to connect the renewable energy system 106 to the inter-system bus 150. There may be two more switches in the system. Switch S6 136 is used to isolate the PV system and converter 1 (e.g., 107) to avoid any potential impact or damage by a high voltage. Switch S7 137 is used to control the detection circuit loop and it is closed unless the PV system is connected to the inter-system bus. The combination of switches S6 136 and S7 137 enables the PV system to be an individual serviceable module, since the PV system may be easily decoupled form the detection loop and main loop. The switches S6 136 and S7 137 enable the PV module to be disconnected independently from the detection circuit. Similarly, switch S4 134 enables the entire PV system to be a power supply module, and may be easily coupled or decoupled to the main power system through the inter-system DC bus 150.

An isolated circuit loop is designed to measure an output current 308 of the PV system 106 in the current detection circuit 301. The current detection circuit 301 may include a current sensor 302, which is to detect the current of the isolated loop, under the condition of using a test resistance 304. The parameters of the current and resistance are used for calculating the actual output for the PV system. There may be a PV controller 303 coupled to the PV system 106, which may get the output current 308 for the PV system in real time when there is a signal sent by the central controller 130 to check the PV power availability.

The current detection circuit 301 may operate in two operating modes: a close circuit mode and an open circuit mode. In the open circuit mode, there is no measurements from the detection circuit, thus, the open circuit mode may be understood as a standby mode.

In the close circuit mode, the current detection circuit 301 may be kept as a constant or continuous close loop circuit, where the output current 308 of the PV system (e.g., 106) is continuously being detected/measured by current detection circuit 301 and provided to the PV controller (e.g., 303), even when the PV system (e.g., 106) is connected to the inter-system DC bus 150. In this way, the measurement of the PV power is in real time, which provides robust and accurate power output detection of the PV system. However, some efficiency of the detection circuit may be lost, and in some of the cases, the threshold current may need to be pre-determined carefully.

In the open circuit mode, the current detection circuit 301 is changed to an open circuit once the PV system 106 connected to the inter-system bus 150 by opening the switch S7 137. In this way, the efficiency loss on the current detection circuit 301 may be eliminated. However, the output current 308 of the PV system (e.g., 106) is not detected in real time. In one embodiment, the controller (e.g., the PV controller 303) may activate the current detection circuit 301 periodically (e.g., by closing the switch S7 137), such as every 10 minutes, to provide a real time measurement on output current of the PV system (e.g., 106). The measured output current may be sent to the PV controller 303 and/or the central controller 130. In one embodiment, when the power supply system has multiple PV systems (e.g., 106, 116, 126) and multiple corresponding current detection circuits, one current detection circuit of the multiple corresponding current detection circuits may operate in the close circuit mode and the other current detection circuits may operate in the open circuit mode. The one current detection circuit in the close circuit mode may be used for the output current detection in real time after the PV systems (e.g., 106, 116, 126) connected to the inter-system bus 150.

Figure 4A:
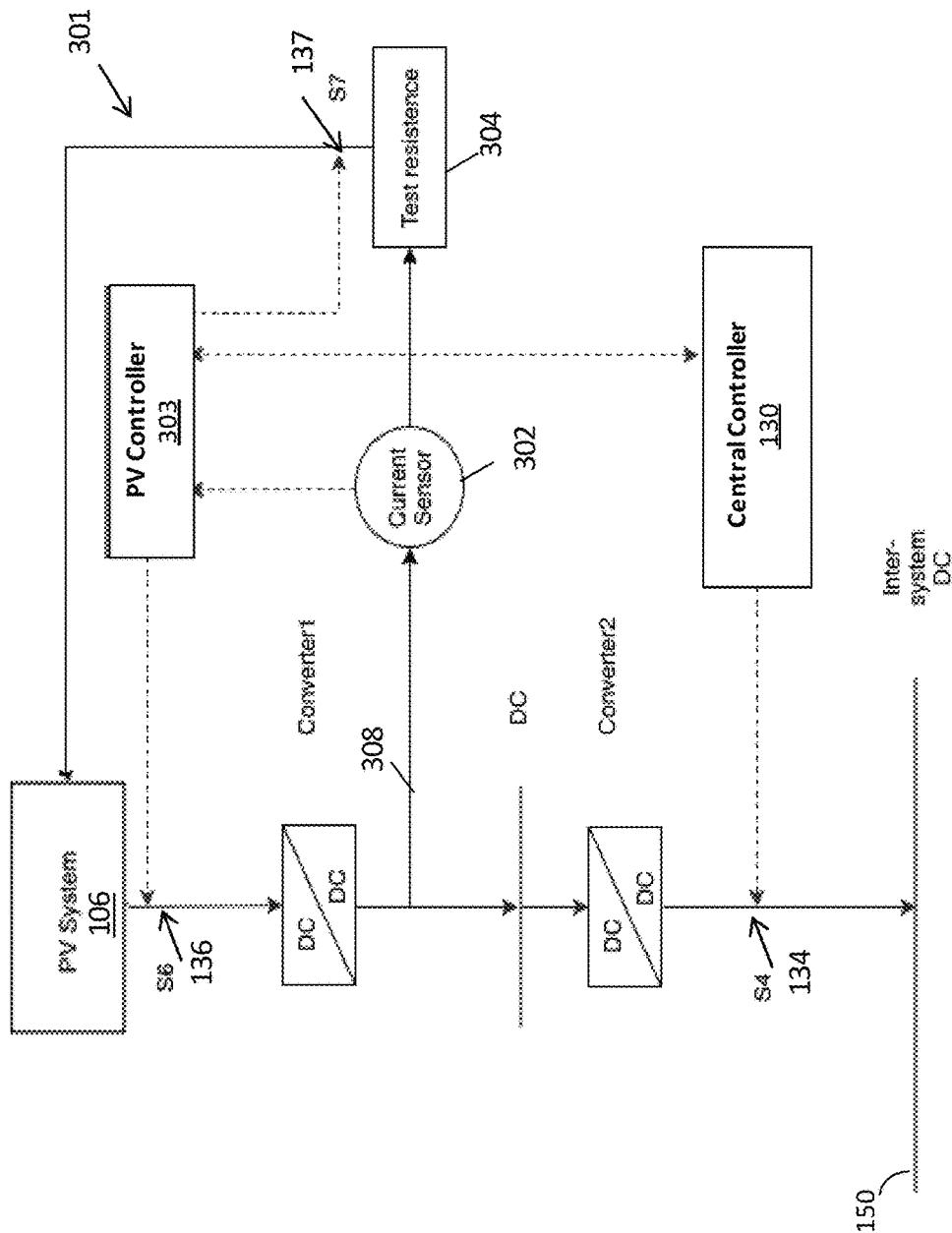
FIGS. 4A-4B are block diagrams illustrating examples of a current detection circuit operating in a close circuit mode according to one embodiment.
Figure 4B:
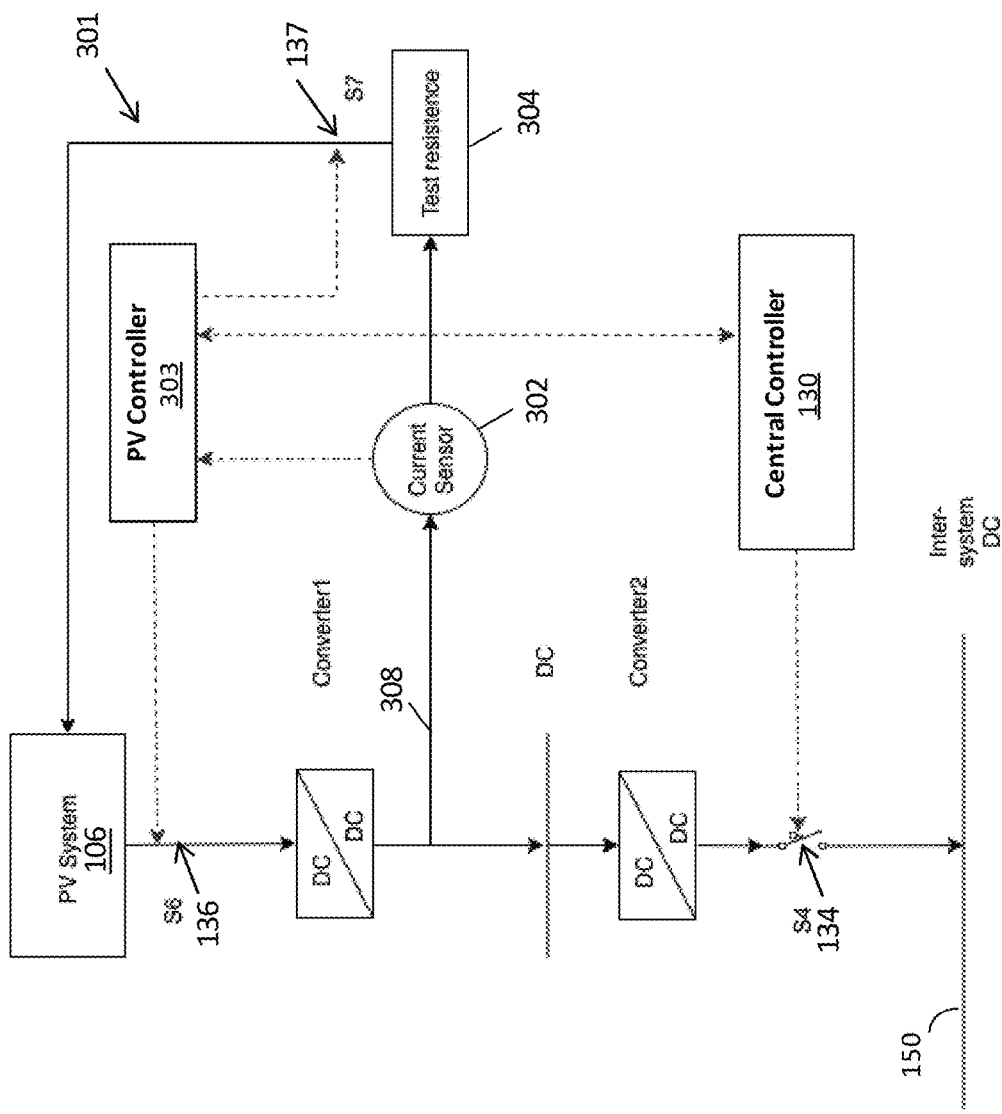

FIGS. 4A-4B are block diagrams illustrating examples of the current detection circuit 301 operating in the close circuit mode according to one embodiment. Referring to FIG. 4A, the current detection circuit 301 may operate in the close circuit mode in a connecting sub-mode. In this sub-mode, the central controller 130 may send a signal to the PV controller 303, then the PV controller 303 may close switch S6 136 and obtain the output current 308 from the current sensor 302. In one embodiment, whether there is a solar power available may be determined by the PV controller 303 and the information may be sent back to the central controller 130. In one embodiment, the output current from the current sensor 302 may be sent to the central controller 130 and the central controller 130 may determine whether there is a solar power available. The central controller 130 may activate or close switch S4 134 to connect the PV system 106 to the intersystem bus 150. Switch S7 137 is kept closed in this sub-mode to collect real the output current in real time. The solid lines show the power flow from the renewable resource 106 to the inter-system bus 150 and the dotted lines indicate the control signals.

Referring to FIG. 4B, the current detection circuit 301 may operate in the close circuit mode in a disconnecting sub-mode. In this sub-mode, the central controller 130 may initiate the PV controller 303, the PV controller 303 may set the switch S6 136 and switch S7 137 close to initiate the detection by measuring the output current of the PV system 106. However, there is no solar power available or availabilities does not meet the requirements. Thus, the central controller 130 may deactivate or open the switch S4 134, and the PV controller 303 may close switch S6136 and switch S7 137 to measure the output current in real time. The dotted lines indicate the control signals. When the output current of the detection circuit output does not satisfy the current threshold, the switch S4 134 is not connected.

Figure 5A:
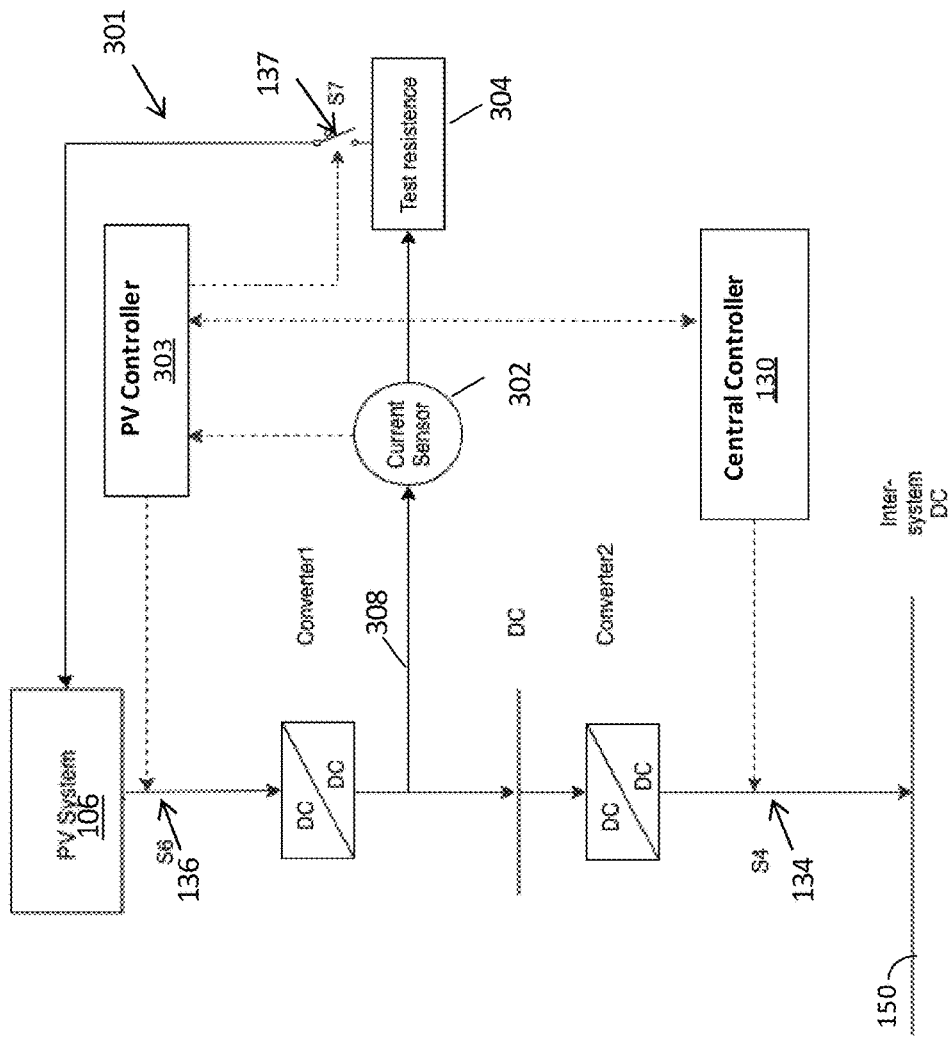
FIGS. 5A-5B are block diagrams illustrating examples of a current detection circuit operating in an open circuit mode according to one embodiment.
Figure 5B:
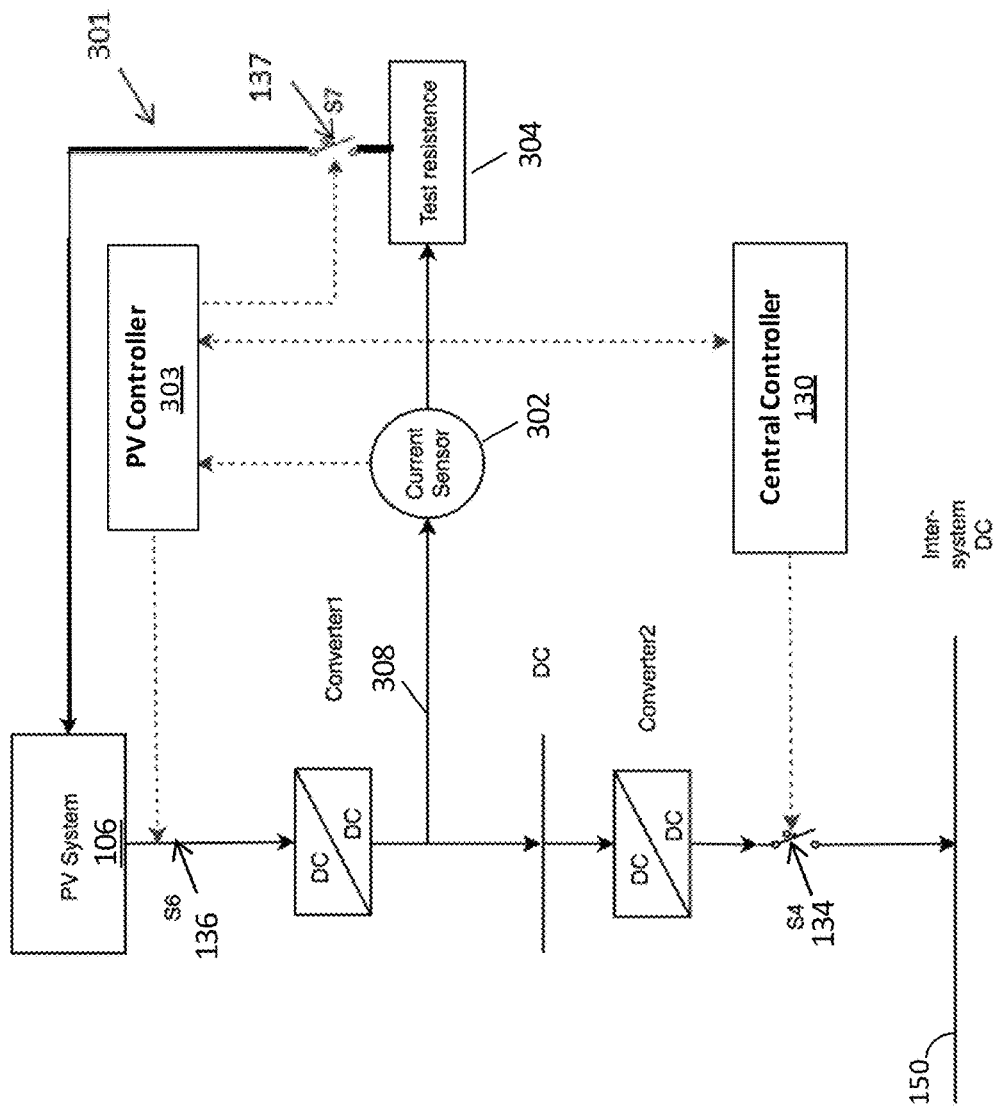

FIGS. 5A-5B are block diagrams illustrating examples of the current detection circuit 301 operating in an open circuit mode according to one embodiment. Referring to FIG. 5A, the current detection circuit 301 may operate in the open circuit mode in a connecting sub-mode. In this sub-mode, once the PV system 106 is connected to the inter-system bus 150, the PV controller 303 deactivate or open the switch S7 137 at the same time. Switch S4 134 is activated or closed to connect the PV system 106 to the intersystem bus 150. The solid lines show the power flow from the renewable resource 106 to the inter-system bus 150 and the dotted lines indicate the control signals.

Referring to FIG. 5B, the current detection circuit 301 may operate in the open circuit mode in a disconnecting sub-mode. In this sub-mode, the PV system 106 is not connected to the inter-system bus 150. Until the central controller 130 sends an enabling signal, then the switch S4 134 may be closed, and the current detection circuit 301 may operate in the connecting mode as shown in FIG. 5A. When the detection circuit 301 is in the open circuit mode, the detection circuit 301 is not triggered to switch to the close circuit mode. However, the detection circuit 301 may be triggered by other detection circuit(s) (e.g., detection circuit in FIG. 7), which is/are in the closed detection mode, directly or indirectly through the central controller 130. This will be further described in connection with the block 611 in FIG. 6. The dotted lines in FIG. 5B indicate the control signals.

Figure 6:
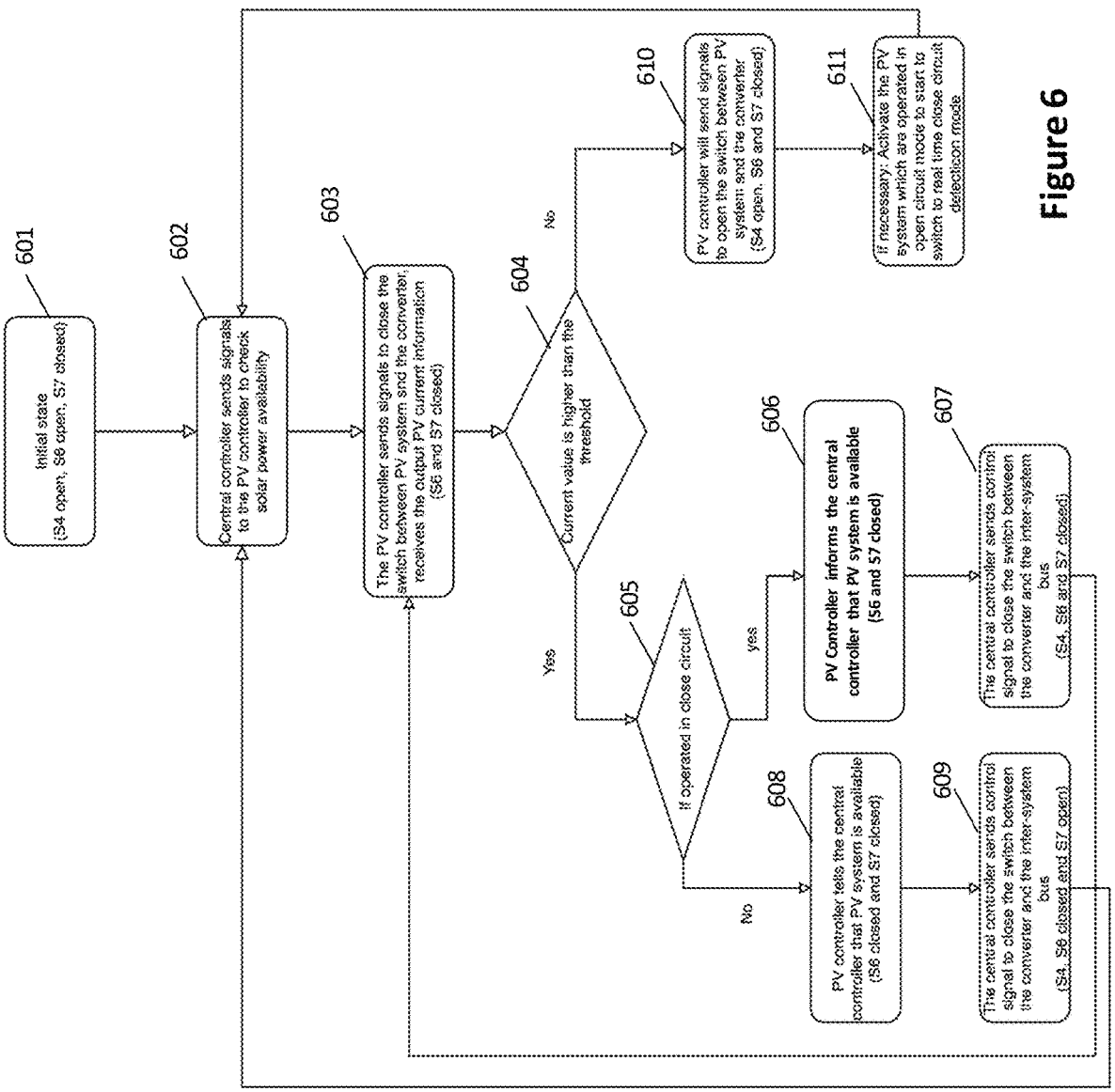
FIG. 6 is a flow diagram illustrating an example of controlling a power supply system of a data center for integrated two different modes according to one embodiment.

FIG. 6 is a flow diagram 600 illustrating an example of controlling a power supply system of a data center for integrated two different operating modes, in a combination of both the open circuit mode and the close circuit mode. FIG. 6 shows the scenario when multiple systems operated in a mixed operating mode. As illustrated in FIG. 6, the current detection circuit may switch between the open circuit mode and the close circuit mode though controlling the switches.

Referring to FIG. 3-FIG. 6, at an initial state 601, the switches S4 134, S6 136 and S7 137 are open. The switch S4134 is to connect a corresponding PV system (e.g., 106) to the inter-system Bus 150.

At block 602, the central controller (e.g., 130) may send a signal to a PV controller (e.g., 303) for checking a solar power availability. The availability of the current detection circuit (e.g., 301) of the PV system (e.g., 106) is captured.

At block 603, the PV controller (e.g., 303) may send signals to close the switch S6 136 between the corresponding PV system (e.g., 106) and a corresponding converter (e.g., 107) and close the switch S7 137 to form a close circuit loop. An output current of the current detection circuit (e.g., 301) of the PV system (e.g., 106) is measured. The PV controller (e.g., 303) may receive the output current of the current detection circuit (e.g., 301).

At block 604, whether the output current in the detection current circuit (e.g., 301) is higher than a threshold current is determined.

At block 605, if the output current in the detection current circuit (e.g., 301) is higher than the threshold current, whether the current detection circuit (e.g., 301) is operated in a close circuit mode is determined.

At block 606, if the current detection circuit (e.g., 301) is operated in the close circuit mode, the PV controller (e.g., 303) may inform the central controller that the corresponding PV system is available, while switch S6 and S7 are closed.

At block 607, the central controller may close the switch (e.g., S4 134) to connect the corresponding PV system (e.g., 106) to the inter-system bus 150.

At block 608, if the current detection circuit (e.g., 301) is not operated in close circuit mode, but in the open circuit mode, the PV controller (e.g., 303) may inform the central controller that the corresponding PV system is available, while switch S6 and S7 are closed.

At block 607, the central controller may activate or close the switch (e.g., S4 134) to connect the corresponding PV system (e.g., 106) to the inter-system bus 150. The switch S7 137 may be opened. For example, the PV controller may open the switch S7 137 once the corresponding PV system (e.g., 106) is connected to the inter-system bus 150.

At block 610, in one embodiment, if the output current in the detection current circuit (e.g., 301) is not higher than the threshold current, the PV controller may deactivate or open the switch (e.g., S6 136) between the PV system 106 and the converter 107.

At block 610, in one embodiment, if the output current in the detection current circuit (e.g., 301) is not higher than the threshold current, if necessary, the PV system operating in the open circuit mode may be activated to start to switch to a close circuit mode to detect an output current of the PV system in real time.

In this way, when the power supply system has multiple PV systems (e.g., 106, 116, 126) and multiple corresponding current detection circuits, one current detection circuit of the multiple corresponding current detection circuits may operate in the close circuit mode and the other current detection circuits may operate in the open circuit mode. The one current detection circuit in the close circuit mode may be used for the output current detection in real time after the PV systems (e.g., 106, 116, 126) connected to the inter-system bus 150.

Figure 7:
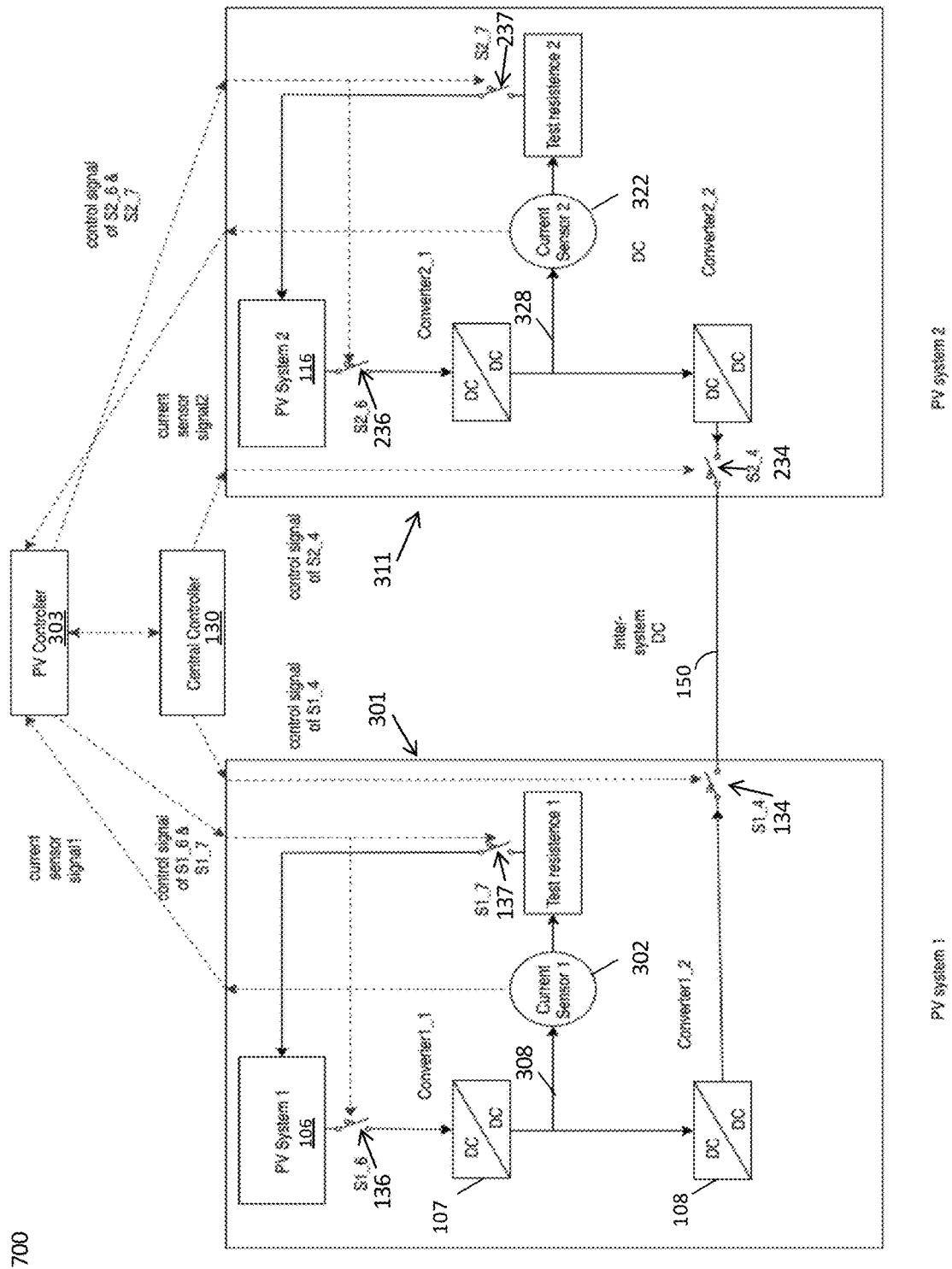
FIG. 7 is a block diagram illustrating an example of multiple renewable energy systems of a data center according to one embodiment.

FIG. 7 is a block diagram 700 illustrating an example of a current detection circuit based multiple renewable energy systems (PV systems) of a data center according to one embodiment. The multiple renewable energy systems (PV systems) may be either identical ones or different ones. The central controller 130 is used to send the request to the PV controller (e.g., 303) for the PV power availability of each PV system (e.g., 106, 116). The central controller 130 also controls the state of switches (e.g., S1_4 134 & S2_4 234) between the PV systems (e.g., 106, 116) and the inter-system bus 150. The PV controller (e.g., 303) receives the data from the current sensor (e.g., 302, 322) and control the state of switches (e.g., S1_6 136 & S2_6 236) between the PV panels (e.g., 106, 116) and the sensors (e.g., 302, 322), as well as the switches (e.g., S1_7 137 & S2_7 237) in the detection circuits loops (e.g., 301, 311). The data from the current sensor (e.g., 302, 322) may include a first output current 308 from the current sensor 302 in a first current detection circuit 301 for a first PV system 106, and/or a second output current 328 from the current sensor 322 in a second current detection circuit 311 for a second PV system 116.

Each of the multiple systems (e.g., 106, 116) has a corresponding current detection circuit (e.g., 301, or 302). The multiple systems may have different types of controlling mode on the multiple detection circuits. For example, the first PV system 106 and the second PV system 116 may have two different types of controlling mode on the two detection circuits (e.g., 301, 311). In one embodiment, the first PV system 106 may keep the corresponding detection circuit 301 in a close circuit mode, and the second PV system 116 may switch the corresponding detection circuit 311 to an open circuit mode once the PV system 116 is connected with the intersystem bus 150. The two PV systems (106, 116) are controlled based on the output current 308 in the first current detection circuit 301 of the first PV system 106. For example, if the output current 308 of the first PV system 106 is higher than a predetermined threshold current, the central controller 130 may close the switches 134 and 234 to connect both the first PV system 106 and the second PV system 116 to the inter-system bus 150. For example, if the PV systems (106, 116) are no longer meeting the connecting requirements, e.g., being lower than the predetermined threshold current, both the first and the second current detection circuits (301, 311) in the two PV systems (106, 116) may switch back to the close circuit mode. In this way, the different operating modes of the current detection circuits in multiple PV systems may be mixed to improve efficiency, and operate as redundant units in some cases.

In another embodiment, the second current detection circuit 311 of the second PV system 116 may be periodically switched from the open circuit mode back to the close circuit mode to measure the second output current 328 of the second PV system 116.

In one embodiment, a PV controller of multiple PV controllers may be coupled with one PV system of the multiple PV systems. In another embodiment, a PV controller of the multiple PV controllers may be coupled with two or more PV systems of the multiple PV systems.

Figure 8:
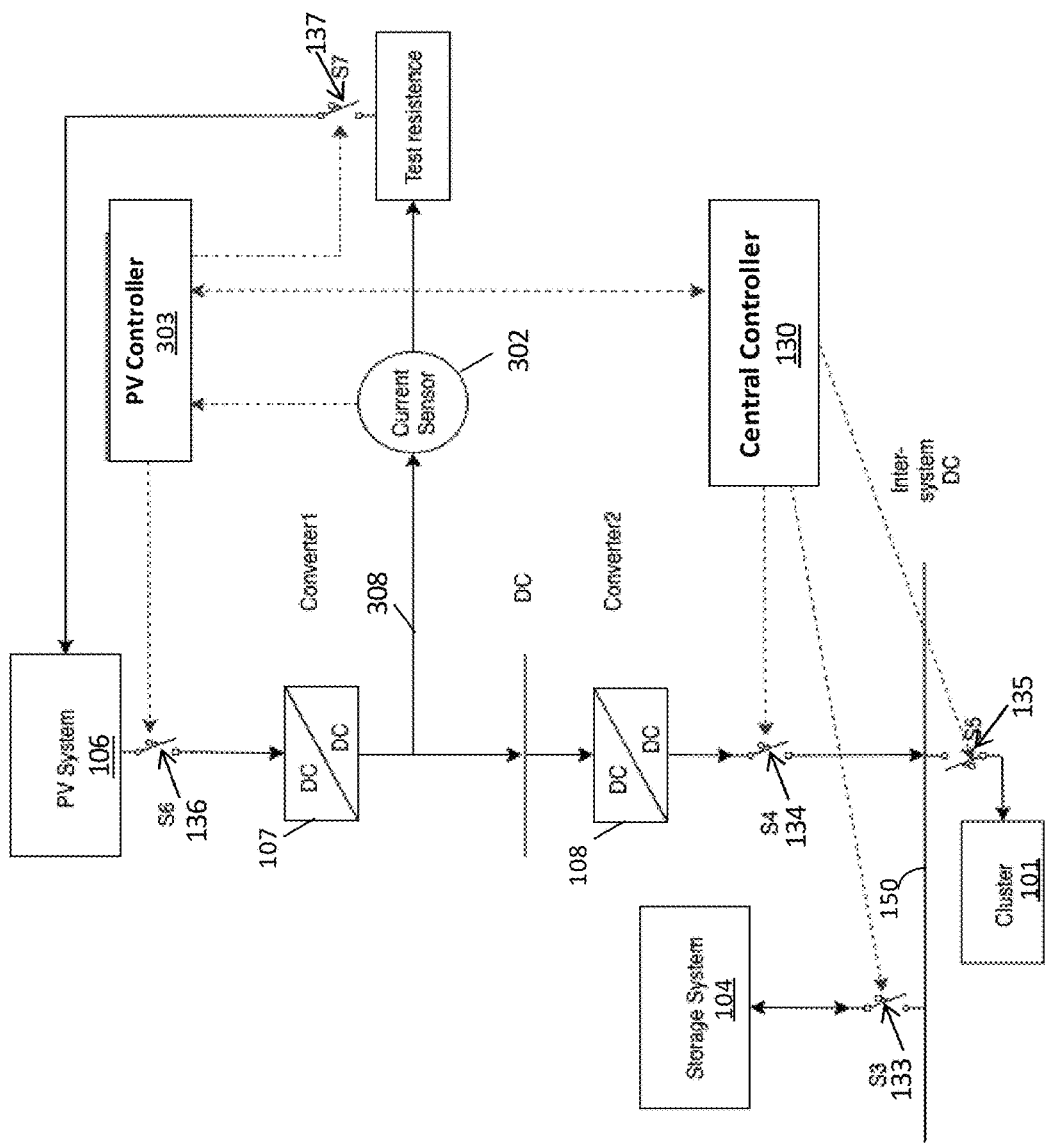
FIG. 8 is a block diagram illustrating an example of a multi-level power control for a renewable energy system of a data center according to one embodiment.

FIG. 8 is a block diagram 800 illustrating an example of a multi-level power control for a renewable energy system of a data center according to one embodiment. FIG. 8 illustrates details in the current detection circuit of the module 100 in FIG. 1. The PV system 106 may be used for different control purposes based on an output current quality. The output current of the PV system 106 may need to be correlated according to the output quality in different levels. As shown in FIG. 8, when the output current 308 is lower than a battery charging threshold, the switches S4 134, S3 133 and S5 135 may remain open, the switches S7 137 and S6 136 may keep closed in a real time detection mode. As illustrated in FIG. 8, the switch S3 133 is to connect a storage system 104 to the inter-system bus 150. The switch S4 134 is to connect the PV system 106 to the inter-system bus 150. The switch S5 135 is to connect a server cluster 101 to the inter-system bus 150. The switch S6 136 is to connect the PV system 106 to the converter 107. The switch S7 137 is to form a close current detection loop in the current detection circuit 301.

When the output current 308 is greater than the battery charging threshold but lower than a predetermined current threshold for a bus connection, the switches S3 133 and S4 134 may be closed to charge the batteries, but the switch S5 135 may remain to be open.

When the output current 308 is greater than the predetermined current threshold for the bus connection, the switch S5 135 is closed. In this way, a multi-level power control for the PV system is enabled to integrate the PV system into the data center power architecture. Advantageously, the multi-level power control provides high efficiency and high flexibility in supplying the PV power from the PV system to one or more server cluster(s) of a data center.

Figure 9:
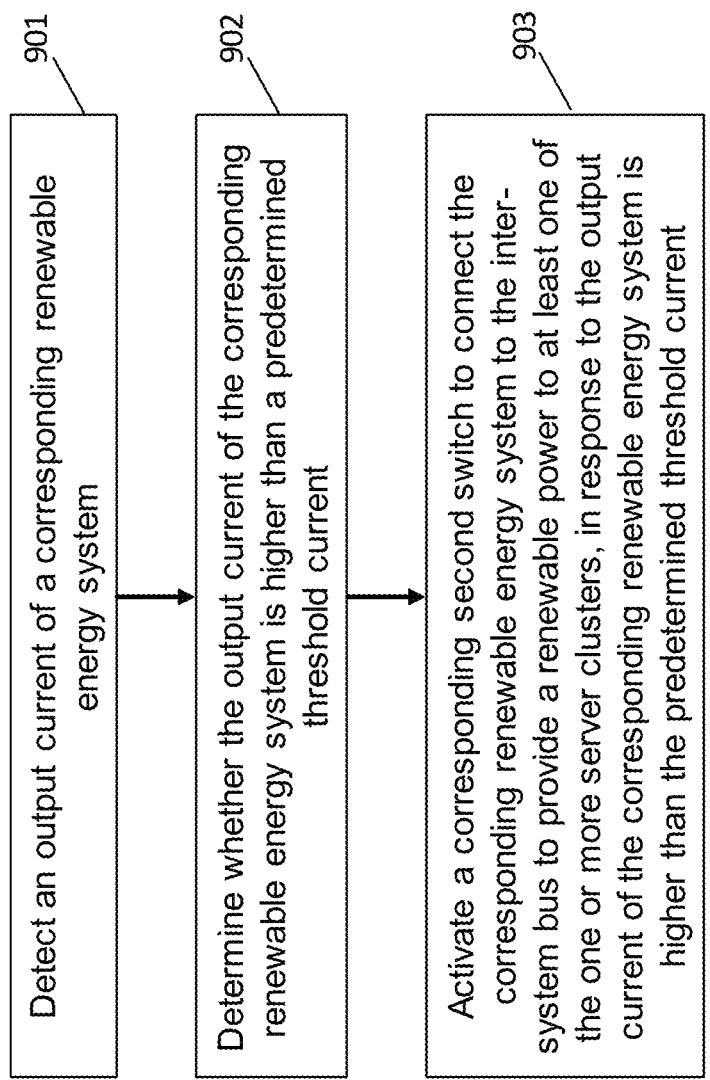
FIG. 9 is a block diagram illustrating an example of a method of managing a power supply system of a data center according to one embodiment.

FIG. 9 is a block diagram illustrating an example of a method of managing a power supply system of a data center according to one embodiment. The power supply system comprises an inter-system bus having one or more first switches, one or more renewable energy systems, one or more second switches and one or more current detection circuits, where each first switch is to connect the inter-system bus to one of the one or more server clusters, where each second switch is coupled to one renewable energy system and connect to the corresponding renewable energy system to the inter-system bus, where each current detection circuit is coupled to one renewable energy system to detect the output current of the corresponding renewable energy system.

At block 901, an output current of a corresponding renewable energy system is detected.

At block 902, whether the output current of the corresponding renewable energy system is higher than a predetermined threshold current is determined.

At block 903, a corresponding second switch is activated to connect the corresponding renewable energy system to the inter-system bus to provide a renewable power to at least one of the one or more server clusters, in response to the output current of the corresponding renewable energy system is higher than the predetermined threshold current.

In one embodiment, the one or more renewable energy systems include one or more photovoltaic (PV) systems.

In one embodiment, one of the one or more first switches is activated to connect a corresponding server cluster to the inter-system bus.

In one embodiment, one current detection circuit of the one or more current detection circuits operates in a close circuit mode to detect an output current of a corresponding renewable energy system, other current detection circuits operate in an open circuit mode, and the one or more renewable energy systems are controlled based on the output current of the one current detection circuit of the corresponding renewable energy system.

In one embodiment, one current detection circuit of the one or more current detection circuits operates in a close circuit mode to detect an output current of a corresponding renewable energy system, and other current detection circuits are switched from an open circuit mode to a close circuit mode periodically.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A power supply system for a data center having one or more of server clusters, the system comprising:
    an inter-system bus having one or more first switches, each of the one or more first switches to connect the inter-system bus to one of the one or more server clusters;
    one or more renewable energy systems and one or more second switches, each of the one or more second switches coupled to one of the one or more renewable energy systems to connect the corresponding renewable energy system to the inter-system bus;
    one or more first direct current (DC)-DC converters and one or more second DC-DC converters, each renewable energy system of the one or more renewable energy systems is connected to a first DC-DC converter of the one or more first DC-DC converters and a second DC-DC converter of the one or more second DC-DC converters, the first DC-DC converter and the second DC-DC converter being connected in series and disposed between a renewable energy system and a corresponding second switch;
    one or more current detection circuits, each of the one or more current detection circuits coupled to one of the one or more renewable energy systems and an output of the corresponding first DC-DC converter connected to the corresponding renewable energy system to detect an output current of the corresponding renewable energy system; and
    a central controller coupled to the inter-system bus and configured to, in response to the output current of the corresponding renewable energy system being higher than a predetermined threshold current, activate the corresponding second switch to connect the corresponding renewable energy system to the inter-system bus to provide a renewable power to at least one of the one or more server clusters.

2. The power supply system of claim 1, wherein the one or more renewable energy systems include one or more photovoltaic (PV) systems.

3. The power supply system of claim 1, wherein the central controller is further configured to activate one of the one or more first switches to connect the corresponding server cluster to the inter-system bus.

4. The power supply system of claim 1, further comprising one or more third switches and one or more third converters, wherein each third switch is coupled between one of the one or more renewable energy systems and one of the one or more third converters.

5. The power supply system of claim 1, further comprising one or more fourth switches, wherein each of the one or more fourth switches is coupled to one of the one or more renewable energy systems to form a close loop in the corresponding current detection circuit.

6. The power supply system of claim 1, further comprising one or more PV controllers, each of the one or more PV controllers receiving a detection result from one of the one or more current detection circuits which receives the output current from the corresponding renewable energy system, and controlling the corresponding renewable energy system based on the detection result.

7. The power supply system of claim 1, wherein one current detection circuit of the one or more current detection circuits operates in a close circuit mode to detect the output current of the corresponding renewable energy system, wherein others of the one or more current detection circuits operate in an open circuit mode.

8. The power supply system of claim 1, wherein one current detection circuit of the one or more current detection circuits operates in a close circuit mode, wherein others of the one or more current detection circuits switch from an open circuit mode to the close circuit mode periodically.

9. A data center comprising:
one or more server clusters;
an inter-system bus having one or more first switches, each of the one or more first switches to connect the inter-system bus to one of the one or more server clusters;
one or more renewable energy systems and one or more second switches, each of the one or more second switches coupled to one of the one or more renewable energy systems to connect the corresponding renewable energy system to the inter-system bus;
one or more first direct current (DC)-DC converters and one or more second DC-DC converters, each renewable energy system of the one or more renewable energy systems is connected to a first DC-DC converter of the one or more first DC-DC converters and a second DC-DC converter of the one or more second DC-DC converters, the first DC-DC converter and the second DC-DC converter being connected in series and disposed between a renewable energy system and a corresponding second switch;
one or more current detection circuits, each of the one or more current detection circuits coupled to one of the one or more renewable energy systems and an output of the corresponding first DC-DC converter connected to the corresponding renewable energy system to detect an output current of the corresponding renewable energy system; and
a central controller coupled to the inter-system bus and configured to, in response to the output current of the corresponding renewable energy system being higher than a predetermined threshold current, activate the corresponding second switch to connect the corresponding renewable energy system to the inter-system bus to provide a renewable power to at least one of the one or more server clusters.

10. The data center of claim 9, wherein the one or more renewable energy systems include one or more photovoltaic (PV) systems.

11. The data center of claim 9, wherein the central controller is further configured to activate one of the one or more first switches to connect the corresponding server cluster to the inter-system bus.

12. The data center of claim 9, further comprising one or more third switches and one or more third converters, wherein each third switch is coupled between one of the one or more renewable energy systems and one of the one or more third converters.

13. The data center of claim 9, further comprising one or more fourth switches,
wherein each of the one or more fourth switches is coupled to one of the one or more renewable energy systems to form a close loop in the corresponding current detection circuit.

14. The data center of claim 9, wherein one current detection circuit of the one or more current detection circuits operates in a close circuit mode to detect the output current of the corresponding renewable energy system, wherein others of the one or more current detection circuits operate in an open circuit mode.

15. The data center of claim 9, wherein one current detection circuit of the one or more current detection circuits operates in a close circuit mode, wherein others of the one or more current detection circuits switch from an open circuit mode to the close circuit mode periodically.

16. A method of managing a power supply system of a data center having one or more of server clusters, the method comprising:
detecting an output current of a corresponding renewable energy system through a corresponding current detection circuit, wherein the power supply system comprises an intersystem bus having one or more first switches, one or more renewable energy systems, one or more second switches, one or more first direct current (DC)-DC converters and one or more second DC-DC converters, and one or more current detection circuits, wherein each of the one or more first switches is to connect the inter-system bus to one of the one or more server clusters, wherein each of the one or more second switches is coupled to one of the one or more renewable energy systems and connect the corresponding renewable energy system to the inter-system bus, wherein each renewable energy system of the one or more renewable energy systems is connected to a first DC-DC converter of the one or more first DC-DC converters and a second DC-DC converter of the one or more second DC-DC converters, the first DC-DC converter and the second DC-DC converter being connected in series and disposed between a renewable energy system and a corresponding second switch, wherein each of the one or more current detection circuits is coupled to one of the one or more renewable energy systems and an output of the corresponding first DC-DC converter connected to the corresponding renewable energy system to detect the output current of the corresponding renewable energy system;
determining whether the output current of the corresponding renewable energy system is higher than a predetermined threshold current; and
activating a corresponding second switch to connect the corresponding renewable energy system to the inter-system bus to provide a renewable power to at least one of the one or more server clusters, in response to the output current of the corresponding renewable energy system being higher than the predetermined threshold current.

17. The method of claim 16, wherein the one or more renewable energy systems include one or more photovoltaic (PV) systems.

18. The method of claim 16, further comprising activating one of the one or more first switches to connect the corresponding server cluster to the inter-system bus.

19. The method of claim 16, further comprising operating one current detection circuit of the one or more current detection circuits in a close circuit mode to detect the output current of the corresponding renewable energy system, operating others of the one or more current detection circuits in an open circuit mode, and controlling the one or more renewable energy systems based on the output current of the one current detection circuit of the corresponding renewable energy system.

20. The method of claim 16, further comprising operating one current detection circuit of the one or more current detection circuits in a close circuit mode to detect the output current of the corresponding renewable energy system, and switching others of the one or more current detection circuits from an open circuit mode to the close circuit mode periodically.

* * * * *